No. 670,601. Patented Mar. 26, 1901.
H. A. WOOD.
VALVE.
(Application filed May 11, 1900.)
(No Model.)
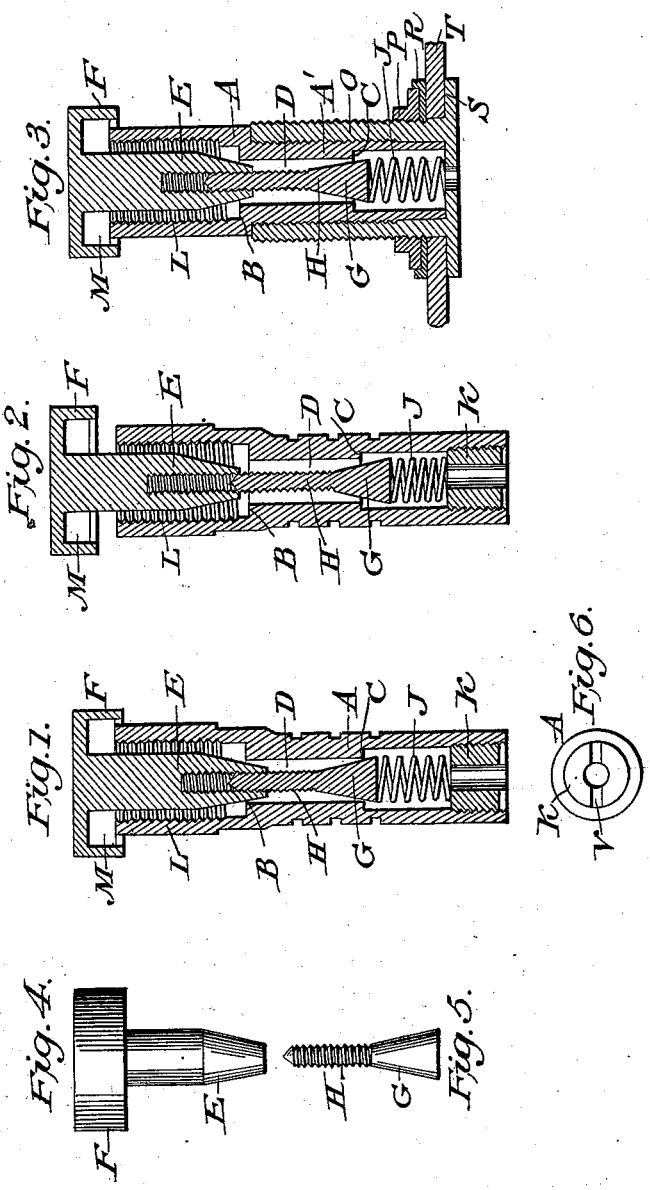
Witnesses:
Inventor:
Henry Alfred Wood

UNITED STATES PATENT OFFICE.

HENRY ALFRED WOOD, OF KINGSTON, CANADA.

VALVE.

SPECIFICATION forming part of Letters Patent No. 670,601, dated March 26, 1901.

Application filed May 11, 1900. Serial No. 16,381. (No model.)

*To all whom it may concern:*

Be it known that I, HENRY ALFRED WOOD, a citizen of the United States, residing at Kingston, in the county of Frontenac and Province of Ontario, in the Dominion of Canada, have invented certain new and useful Improvements in Air-Valves, of which the following is a specification.

The invention relates to that class of air-valves having one or more conical or tapered metal plugs or valves working in metal seats; and its object is to secure the simplicity and durability arising from the use of such valves and seats without washers and at the same time to obviate the difficulty arising from imperfect fitting or uneven wearing of the parts or from the interference of foreign matter between them. This end is attained by the means hereinafter referred to, among which is the use instead of tapered valve-seats of valve-seats formed as the ends of a cylindrical shaft or bore, the seats thus presenting for contact with the tapered plugs or valves merely their narrow edges or lips.

In the accompanying drawings a preferred form of the invention adapted particularly for use with a pneumatic tire, to which it may be attached by the usual means, is shown.

Figure 1 is a longitudinal central section showing the valve closed. Fig. 2 is a similar section showing the valve open for deflation. Fig. 3 is a section similar to Fig. 1, but showing also another device in combination for attaching the valve-casing to the tire. Fig. 4 is a view of the removable cap and its attached valve. Fig. 5 is a view of an inner valve, and Fig. 6 represents an end view of the valve-closing and of the perforated block which forms a rest for the internal spring shown.

Similar letters refer to similar parts in the several views.

A is the valve casing or shell, having the valve-seats B and C formed as the ends of a central longitudinal cylindrical opening D and presenting to the valves bearing-surfaces formed by the edges of the circular shelves at B and C instead of the usual tapered seats.

E is an outer valve having a milled cap F made, preferably, in one part with it.

G is an inner valve having a stem H screw-threaded to engage with a screw-threaded aperture in the valve E.

J is a coiled spring adapted to rest upon the perforated block or plug K, screwed into the end of the valve casing or shell and serving to hold the inner valve in position. The outer end of the valve casing or shell is screw-threaded internally or otherwise prepared to receive the tube of an air-pump during inflation.

To inflate a pneumatic tire to which the valve may be attached, the milled cap F, with its attached valve E, is turned and removed, the inner valve G being held from turning by friction. The pump is then screwed into the end of the valve-casing at L, and the lower valve acts as a check during pumping. Upon removing the pump and replacing the valve E in position by turning the cap F both valves by the aid of the stem connecting them will be drawn home into their seats, as in Fig. 1. To deflate the tire, the cap F is turned once or twice, and then pressure upon it will also force the inner valve from its seat, and deflation may take place, as in Fig. 2.

The various parts may be made of metal, and preferably of brass, on account of its non-corrosive and non-oxidizing properties. A washer of rubber may be placed in the recess M in the cap F, thus affording an additional check against leakage and also thereby rendering the interior of the valve dust-proof.

The main objections to the use of metal valves without washers have been the difficulty encountered in attempting to make a conical or tapered valve fit a conical or tapered seat and the danger from the intervention of dust or grit or any foreign matter between the valve and the valve-seat. In my improved air-valve the valves proper or plugs can much more readily be made to fit the valve-seats, as the valve-seats are merely the edges or lips of the cylindrical opening shown and are only to have contact with the valves along the lines of such edges or lips, instead of as in the older form over an extended tapered surface, while on account also of the width of the valve-seat being reduced to a minimum dust or grit will not lodge and interfere. Furthermore, the two valves or plugs being drawn simultaneously into their seats afford a perfect barrier at all times when closed and a ready means of deflation when slightly separated, while the inner valve at all times acts as a check. In my invention the spring shown may be much lighter than in other valves, as it is not intended to do more than hold the inner valve or plug in place, both plugs being drawn close into their seats by the stem between them when the valve is closed. It must also be noted that if I use the washer in the cap, as shown, I afford a triple barrier against the escape of air.

In the design shown in Figs. 1 and 2 of the drawings the valve casing or shell has ridges or grooves on its outer surface and is adapted for use where a "mushroom" tube is used to surround it and connect it with the pneumatic tire or other inclosure in which the air is to be confined; but in Fig. 3 another design is shown. An outer casing O is permanently attached to the tire, the head S upon this casing O being slipped through an orifice in the tire T, and a washer R, with cement applied to it, being slipped down against the tire and held in place securely by a nut P, screwed down upon a thread cut in the outer surface of the casing O. If the valve casing or shell A in this design be screw-threaded upon the outer surface of its lower portion A' to engage with a corresponding thread with the casing O, the valve will be detachable at will for repair. Any leakage between the valve-casing and the permanently-attached casing or collar O may be prevented by applying white lead or lubricant to the threads.

I am aware that metal valves in metal seats have been used prior to my invention, and I do not claim the mere elimination of washers as patentable; nor, on the other hand, do I, by expressly limiting the claims below to a valve for use with air only, suggest any lack of novelty or utility in the invention as applicable to other substances; but I am making a separate application with regard to valves for liquids or gases other than atmospheric air, and desiring by this application to protect a valve for use with air only and chiefly in connection with the pneumatic tire of a bicycle or other vehicle I say that

What I claim as new herein, and desire to protect by Letters Patent, is—

1. In a valve for confining or controlling air, the combination with a valve casing or shell adapted to be attached to a confined-air chamber, of two tapered valves or plugs directed toward each other, valve-seats interposed between them formed as the ends of a cylindrical opening so as to present only their inner circular edges to the valves or plugs, a screw-threaded stem upon one valve engaging with a screw-threaded opening in the other and adapted to draw the valves together, a cap or head upon the outer valve and a device to hold the inner valve in place, all substantially as and for purposes described.

2. In a valve for confining or controlling air, the combination, with a valve shell or casing adapted to be attached to the inclosure in which air is to be confined and having a central longitudinal cylindrical opening connecting the inlet and outlet, of two conical or tapered valves proper or plugs directed toward each other within the ends of the said casing at opposite ends of the said cylindrical opening, valve-seats formed by the edges or lips of the ends of the said cylindrical opening, a screw-threaded stem upon the inner valve or plug, a corresponding screw-threaded opening in the apex of the outer valve or plug, a cap formed in one piece with the outer valve and adapted to cover the end of said casing, an annular washer or cushion of rubber to be inserted around the said stem inside the said cap, means for attaching an air-pump to the said casing, a perforated plug or block to fasten in the inner end of said casing, and a spring to rest thereon and press the inner valve or plug in place, all substantially as and for the purposes described.

Kingston, Ontario, Canada, April 28, 1900.

HENRY ALFRED WOOD.

Witnesses:
THOMAS JOSEPH NUGENT,
JAMES ALBERT KEARNS.